US012725023B2

(12) United States Patent
Fok et al.

(10) Patent No.: US 12,725,023 B2
(45) Date of Patent: Sep. 1, 2026

(54) METHODS AND APPARATUS FOR SYSTEM-ON-A-CHIP NEURAL NETWORK PROCESSING APPLICATIONS

(71) Applicant: Femtosense, Inc., San Bruno, CA (US)

(72) Inventors: Sam Brian Fok, San Leandro, CA (US); Alexander Smith Neckar, Redwood City, CA (US); Gabriel Vega, Kailua, HI (US)

(73) Assignee: Femtosense, Inc., San Bruno, CA (US)

(*) Notice: Subject to any disclaimer, the term of this patent is extended or adjusted under 35 U.S.C. 154(b) by 954 days.

(21) Appl. No.: 18/049,453

(22) Filed: Oct. 25, 2022

(65) Prior Publication Data

US 2023/0133088 A1 May 4, 2023

Related U.S. Application Data

(60) Provisional application No. 63/263,371, filed on Nov. 1, 2021.

(51) Int. Cl.
*G06N 3/063* (2023.01)

(52) U.S. Cl.
CPC .................................... *G06N 3/063* (2013.01)

(58) Field of Classification Search
None
See application file for complete search history.

(56) References Cited

U.S. PATENT DOCUMENTS 10,452,540 B2* 10/2019 Akopyan ................. G06N 3/10
10,452,744 B2 10/2019 Agrawal et al.
10,515,046 B2* 12/2019 Fleming ................ G06F 9/5027
10,831,693 B1* 11/2020 Huang .................... H04L 12/18
10,965,315 B2 3/2021 Kamal
11,561,833 B1* 1/2023 Heaton ............... G06F 9/45504
11,625,592 B2 4/2023 Fok et al.
2007/0220517 A1 9/2007 Lippett
2007/0283357 A1 12/2007 Jeter et al.

(Continued)

OTHER PUBLICATIONS

"AMBA AXI and ACE Protocol Specification, Issue H.c." to Arm Limited, published Jan. 26, 2021.

(Continued)

*Primary Examiner* — Chikaodili E Anyikire
(74) *Attorney, Agent, or Firm* — Wang Hardoon, P.C.

(57) ABSTRACT

Methods and apparatus for multi-purpose neural network core and memory. The asynchronous/parallel nature of neural network tasks may allow a neural network IP core to dynamically switch between: a system memory (in whole or part), a neural network processor (in whole or part), and/or a hybrid of system memory and neural network processor. In one specific implementation, the multi-purpose neural network IP core has partitioned its sub-cores into a first set of neural network sub-cores, and a second set of memory sub-cores that operate as addressable memory space. Partitioning may be statically assigned at "compile-time", dynamically assigned at "run-time", or semi-statically assigned at "program-time" Any number of considerations may be used to partition the sub-cores; examples of such considerations may include, without limitation: thread priority, memory usage, historic usage, future usage, power consumption, performance, etc.

20 Claims, 8 Drawing Sheets

(56) References Cited

U.S. PATENT DOCUMENTS

2014/0306970 A1 10/2014 Surti et al.
2014/0331029 A1 11/2014 Foo et al.
2015/0379668 A1 12/2015 Weissmann et al.
2018/0113713 A1 4/2018 Cheng et al.
2018/0189234 A1 7/2018 Nurvitadhi et al.
2019/0349318 A1 11/2019 Fok et al.
2019/0379396 A1 12/2019 Bajic et al.
2020/0019837 A1 1/2020 Boahen et al.
2020/0135095 A1 4/2020 Mobasher
2020/0293866 A1* 9/2020 Guo ....................... G06N 3/045
2021/0200610 A1 7/2021 Chu et al.
2021/0397943 A1 12/2021 Ribalta et al.
2022/0012060 A1 1/2022 Fok et al.
2022/0012575 A1 1/2022 Fok et al.
2022/0012598 A1 1/2022 Fok et al.
2022/0101108 A1* 3/2022 Akopyan ............... G06N 3/063
2022/0164297 A1* 5/2022 Sity ..................... G06F 12/1458
2023/0133088 A1 5/2023 Fok et al.
2024/0095542 A1* 3/2024 Kilari .................... G06F 9/5066

OTHER PUBLICATIONS

U.S. Appl. No. 17/367,512, filed Jul. 5, 2021, Sam Brian Fok.
U.S. Appl. No. 17/367,517, filed Jul. 5, 2021, Sam Brian Fok.
U.S. Appl. No. 17/367,521, filed Jul. 5, 2021, Sam Brian Fok.
U.S. Appl. No. 18/049,453, filed Oct. 25, 2022, Sam Brian Fok.

* cited by examiner

METHODS AND APPARATUS FOR SYSTEM-ON-A-CHIP NEURAL NETWORK PROCESSING APPLICATIONS

PRIORITY APPLICATIONS

This application claims the benefit of priority to U.S. Provisional Patent Application Ser. No. 63/263,371 filed Nov. 1, 2021 and entitled "METHODS AND APPARATUS FOR SYSTEM-ON-A-CHIP NEURAL NETWORK PROCESSING APPLICATIONS", the foregoing incorporated by reference in its entirety.

STATEMENT REGARDING FEDERALLY SPONSORED RESEARCH OR DEVELOPMENT

This invention was made with Government support under Agreement No. N00014-19-9-0003, awarded by ONR. The Government has certain rights in the invention.

RELATED APPLICATIONS

This application is related to U.S. patent application Ser. No. 17/367,512 filed Jul. 5, 2021, and entitled "METHODS AND APPARATUS FOR LOCALIZED PROCESSING WITHIN MULTICORE NEURAL NETWORKS", U.S. patent application Ser. No. 17/367,517 filed Jul. 5, 2021, and entitled "METHODS AND APPARATUS FOR MATRIX AND VECTOR STORAGE AND OPERATIONS", and U.S. patent application Ser. No. 17/367,521 filed Jul. 5, 2021, and entitled "METHODS AND APPARATUS FOR THREAD-BASED SCHEDULING IN MULTICORE NEURAL NETWORKS", each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of neural network processing. More particularly, the present disclosure is directed to hardware, software, and/or firmware implementations of neural network IP (intellectual property) cores that provide multiple functionalities for system-on-a-chip (SoC) applications.

DESCRIPTION OF RELATED TECHNOLOGY

Incipient research is directed to so-called "neural network" computing. Unlike traditional computer architectures, neural network processing emulates a network of connected nodes (also referred to throughout as "neurons") that loosely model the neuro-biological functionality found in the human brain.

A system-on-a-chip (SoC) is an integrated circuit (IC) that integrates multiple intellectual property (IP) cores of a computer system. The SoC design flow allows different IP vendors to contribute pre-validated IP cores to an IC design. The IP cores are treated as a "black box" that may be connected via glue logic. The SoC design flow allows a system integrator to incorporate many different functionalities within a single silicon die by only verifying glue logic (e.g., only the input/output functionality of the IP core is verified); this technology offers substantially better performance than wired solutions (e.g., motherboard-based computer systems) while also shortening chip design cycles.

Most SoC designs are highly constrained in terms of both silicon die space and power consumption. Unfortunately, existing neural network IP cores have substantial memory requirements (e.g., >90% of a neural network IP core may be memory gates). The area footprint of neural network IP cores can be prohibitively expensive for most SoC designs.

DETAILED DESCRIPTION

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Existing Techniques for Neural Network Processing

Figure 1:
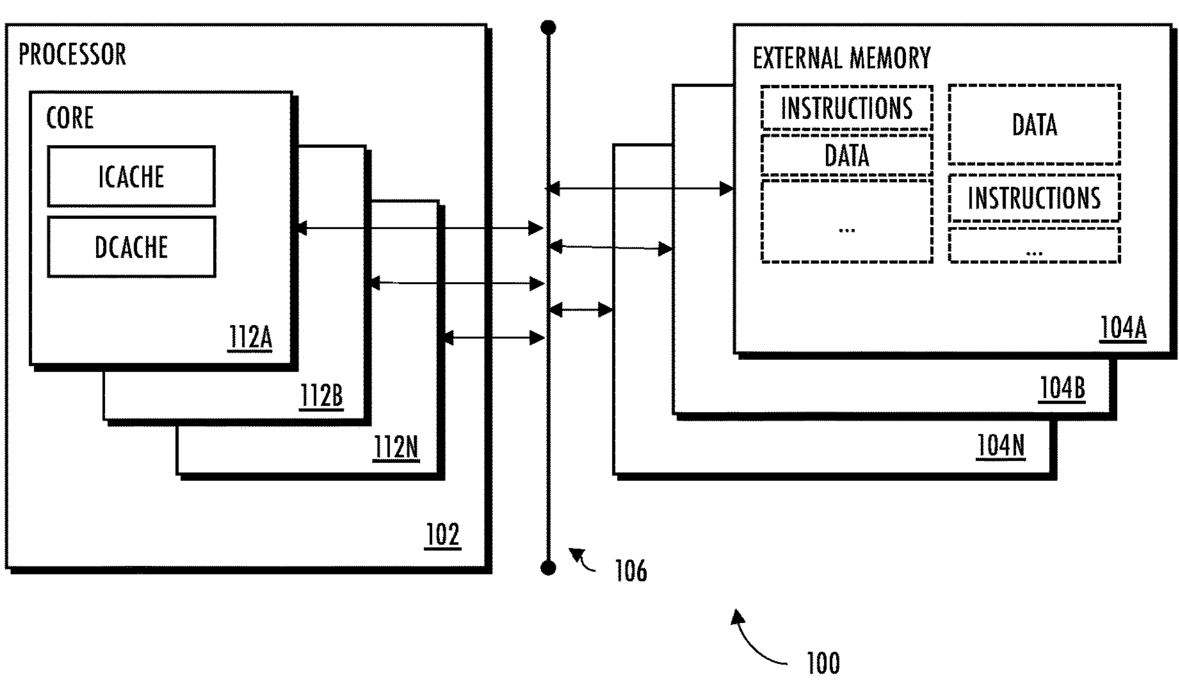
FIG. 1 is a graphical representation of a multicore processor architecture, commonly used within the processing arts.
Figure 1:
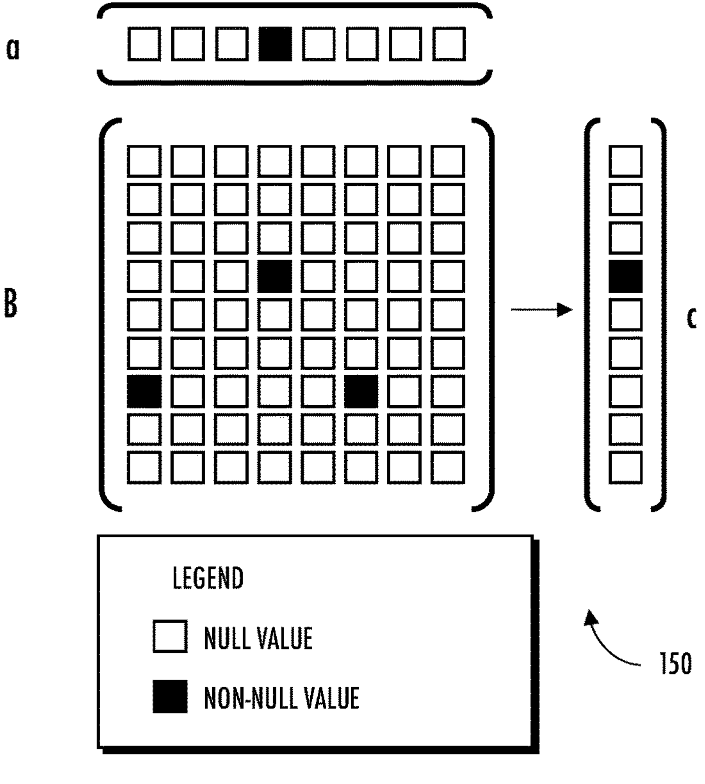

FIG. 1 is a graphical representation of a multicore processor architecture 100, commonly used within the processing arts. The multicore processor 102 may include one or more cores 112A, 112B . . . 112N. Each core may include logic (e.g., arithmetic logic units (ALUs), registers, etc.) arranged to perform various control and data path operations. Examples of control and data path operations may include without limitation: instruction fetch/instruction decode (IF/ID), operation execution and addressing, memory accesses, and/or data write back. A small amount of frequently used instructions and data may be locally cached "on-chip" for fast access; otherwise, "off-chip" storage provides cost-effective storage of bulk data (in the external memories 104A, 104B . . . 104N).

During operation, the processor cores 112A, 112B . . . 112N read and write computer instructions and/or data from the external memories 104A, 104B . . . 104N via a shared bus interface 106. Each computer instruction (also referred to as an "opcode") identifies the operation to be sequentially performed based on one or more operands (data, register locations, and/or memory addresses). By linking together sequences of computer instructions, it is possible to compute any computable sequence.

In "general-purpose" computing, the processor cores and memories may be tasked with any arbitrary task. A shared bus architecture and monolithic memory map flexibly allows every core 112A, 112B . . . 112N to access any memory location within the external memories 104A, 104B . . . 104N. As a practical matter, however, the shared bus interface 106 is physically pin-limited; there is a fixed width data bus that services all processor-memory connections one-at-a-time. Limited connectivity can significantly affect performance where multiple cores try to access the memories at the same time. Additionally, local cache sizes are limited; reading and writing to large data structures may require multiple "off-chip" transactions across the pin-limited bus. Finally, "global" data structures cannot be accessed by more than one core at a time (simultaneous access could result in data hazards and race conditions).

Unlike general-purpose computing, so-called "neural network" computing uses biologically-inspired algorithms that take their inspiration from the human brain. Neural networks are characterized by a multi-layered composition of high-dimensional linear and non-linear functions. The intermediate function outputs between layers are known as activations. Neural networks typically contain a large number of parameters that are used for e.g., vector-matrix operations. The parameters are tuned in a gradient descent training process based on known input/output data pairings. After training, the parameters are held constant during deployment as the neural network processes novel input data to execute its trained task. For example, FIG. 1 graphically depicts one exemplary neural network computation that is performed as a vector-matrix multiplication 150. As shown therein, neural activations are modeled as a vector of digital values (a) that are multiplied by a matrix of parameter weights (B) for the neural network; the output (c) corresponds to the output neural activations.

Unfortunately, naïvely allocating neural network processing to the multicore processor architecture 100 is extremely inefficient. Firstly, each of the cores 112A, 112B, . . . 112N must access the complete set of neural network data structures. The vector and matrix dimensions are a function of the number of nodes (neurons) within the neural network, thus neural networks of any significant size exceed data sizes that can be efficiently cached on-chip. As a result, all of the cores 112A, 112B, . . . 112N constantly move data across the pin-limited bus interface 106. Additionally, each of the cores 112A, 112B, . . . 112N read and write to the same data structures (a, B, c) and often block one another.

As a related issue, "Big O" notation is used in the computer arts to classify algorithms according to computational complexity (run time and space requirements O, as a function of input size n.) Big O notation is widely used to describe the limiting behavior of a function as it increases, e.g., processing complexity, memory storage, bandwidth utilization, etc. For example, vector-matrix multiplication has a computational complexity of $O(n^2)$ for vector size (n) because each element of the vector must be multiplied by a corresponding element of each row and column of the matrix. Doubling the vector size (n) quadruples the computational complexity ($O(n^2)$).

Referring back to FIG. 1, existing neural networking solutions rely on general-purpose vector-matrix operations. Such solutions often use hardware accelerators to perform "brute-force" element-by-element calculation. However, the data structures that are used in neural network processing can be made to be quite sparse (a high ratio of null values.) Brute force vector-matrix operations can be particularly inefficient for sparse data structures because the vast majority of memory reads, vector-matrix multiplications, and memory write-backs are unnecessary (null valued). Furthermore, as neural networks continue to grow in size and complexity, inefficient brute force solutions will quadratically increase in complexity.

Substantial factors in neural network energy consumption may include moving large amounts of data across a wired memory bus and storing a large number of parameters in SRAM (static random access memory). Charging and discharging wires to transfer data takes energy. Wire energy costs scale with wire length (a function of chip area) and is a significant concern for chip design. As a related issue, neural networks are parameter-rich, but on-chip SRAM memory is costly to implement. On-chip SRAM is optimized for performance, not power consumption, so SRAM cells may consume significant amounts of energy even when idle, due to leakage.

System-On-A-Chip (SoC) and Intellectual Property (IP) Cores

Most integrated circuits (IC) are constructed from a carefully prepared semiconductor substrate. For example, silicon chips are manufactured from a single-crystal silicon ingot ("boule") that has been synthesized such that the entire crystal lattice is continuous and unbroken. The boule is cut into "wafers", which are lapped and polished. This precise method of manufacture ensures that the silicon substrate has uniform characteristics across the entire surface. The silicon wafers are then etched, doped, and sealed in layers to form one or more integrated circuit "dies." Sequential and/or combinatorial logic gates can be fabricated and connected by carefully controlling the layered construction of each die. Thereafter, the wafer is cut into the individual dies. As a final step, each die may then be packaged into a chip (epoxied, wire-bonded to external leads, encased in packaging, etc.). So-called "stacked die" chips may have multiple dies that are bonded to one another within the same package. Notably, each die is inseparably electrically connected and is considered an indivisible unit for the purposes of construction and commerce.

On-die circuitry uses silicon gates to perform electrical signaling and store electrons. The material properties of the silicon substrate and the physical size of transistor gates (as small as single-digit nm (nanometers)) and traces enable very efficient signaling with only a few electrons. In contrast, off-die circuitry must exit the silicon substrate via wire bonding and input/output (I/O) drivers; this represents magnitudes more power consumption and much slower switching rates. In other words, keeping logic on-die is highly desirable for performance, low-power, and/or embedded applications.

While integrated circuits provide a variety of power and performance benefits, once created their physical construction (and logic) cannot be altered. Even small errors in a die's logic can render the entire batch useless at significant capital expense. In order to reduce the risk of failure, designs are verified for correctness before they are manufactured (so-called "functional verification"). By some estimates, functional verification may exceed 70% of the chip design life cycle (from inception to fabrication). As a further complication, modern components often incorporate many different sub-components and/or functionalities; it is impractical (if not physically impossible) to simulate and/or test for all possible errors within a design.

Figure 2:
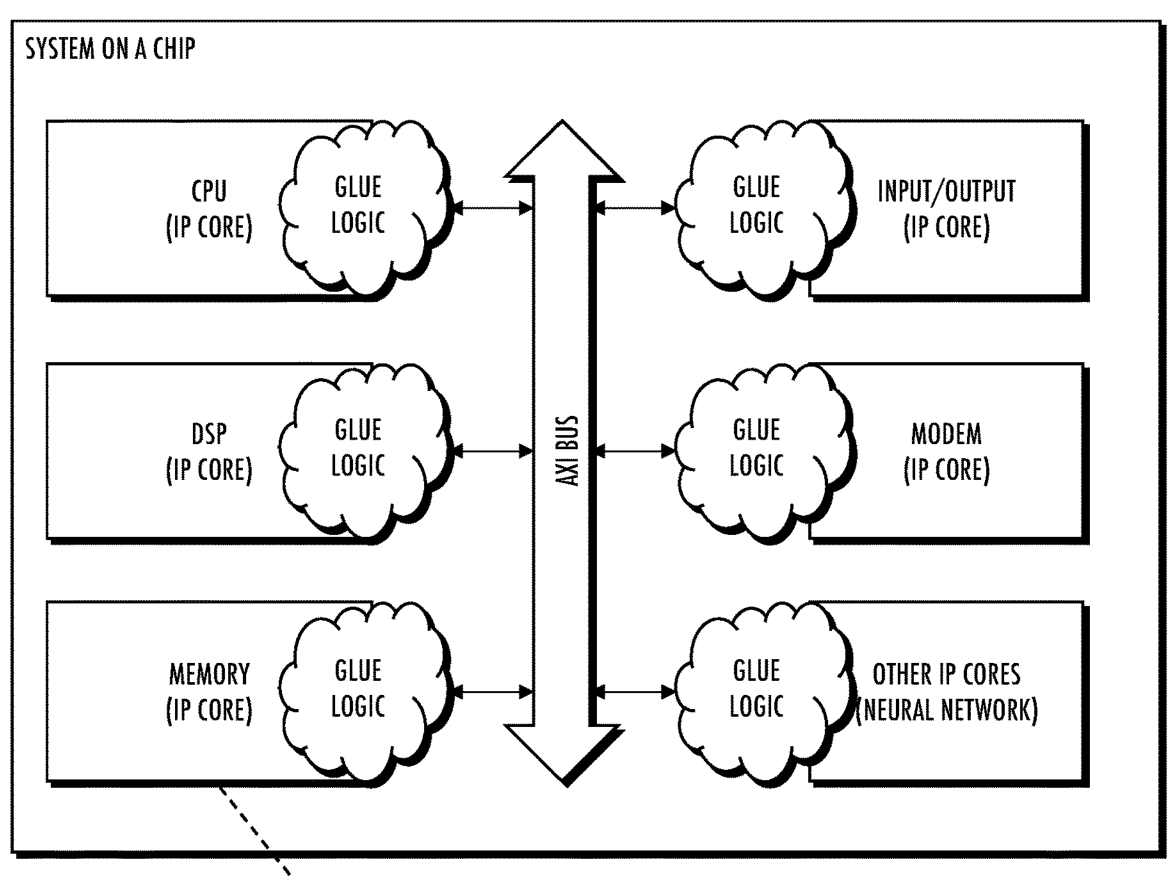
FIG. 2 is a graphical representation of one exemplary system-on-a-chip (SoC), useful for explaining various aspects of the present disclosure.
Figure 2:
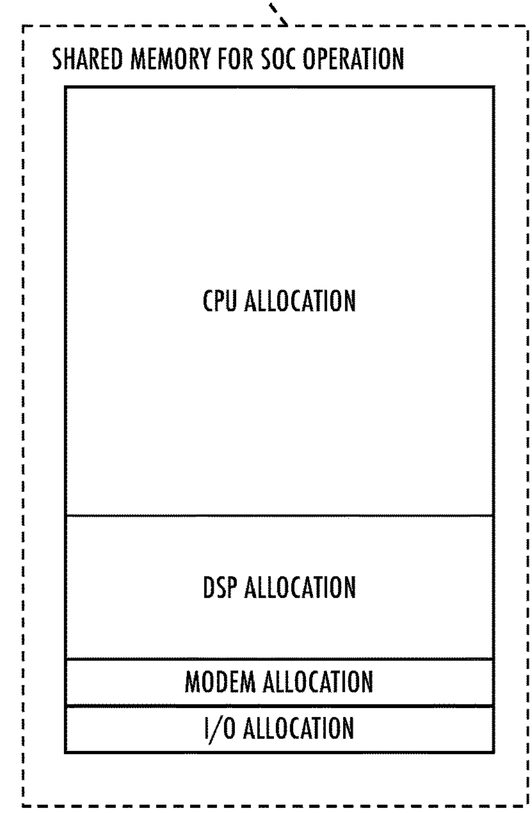

Over time, IC design flows have evolved several different techniques for handling the high risk/high reward chip design life cycle. One such technique is the so-called "system-on-a-chip" (SoC) design flow. FIG. 2 is a graphical representation of one exemplary system-on-a-chip (SoC), useful for explaining various aspects of the present disclosure. As shown, SoCs split a larger design into multiple different components that are independently designed and "pre-validated" as intellectual property (IP) cores. The IP cores are typically connected to one or more shared interconnects. In many cases, a chip manufacturer may outsource or license IP cores from external vendors to focus their resources on core competencies. The SoC design flow allows a system integrator to incorporate many different functionalities within a single silicon die by only verifying glue logic (e.g., only the input/output functionality of the IP core is verified); this technology offers substantially better performance than systems connected at the die-to-die or circuit board level while also shortening design cycles.

As a brief aside, chip designs are typically written in a human readable language (e.g., hardware description language (HDL)) as register transfer logic (RTL). During design "synthesis", RTL is translated to technology specific gate structures and netlists in a process referred to as "mapping." The netlist is then placed into a layout during "implementation" through sub-steps of "floor planning", and "placement", and "routing." IP cores may be provided at any point of the chip design cycle; for example, an RTL IP core may be provided as a "soft-macro" for synthesis, as synthesized netlists for use during mapping, and/or as "hard macros" (layout files) during placement and floor planning.

Referring back to FIG. 2, IP cores are treated as a "black box" to the rest of the SoC. In other words, the IP core's internal logic is isolated from the rest of the design. In some cases, the IP core may have its own clock, power, and/or other processing and memory resources. To transfer data into and out-of the IP core, most IP cores implement an interface using internal glue logic to communicate with the SoC's system interconnects. In the illustrated embodiment, all of the IP cores communicate using the common AXI bus protocol. Typically, system busses are generic memory busses that are suitable for system-wide usage within a processor family. Examples of such bus technologies may include, without limitation, e.g., the Advanced eXtensible Interface (AXI) protocol promulgated under Advanced Microcontroller Bus Architecture (AMBA) which is commonly used by ARM processors, the Peripheral Component Interconnect (PCI) and PCI-Express (PCIe) protocols used by Intel processors, and/or TileLink which is commonly used with RISC-V processors, etc.

In the illustrated embodiment of FIG. 2, the memory IP core provides an addressable memory space that is used by the other IP cores. While most IP cores have their own internal memory for the core's own operation, system memory is often used for cross-core communication. For example, a CPU may access a DSP memory space to write input data and/or read output data; similar schemes are used for I/O and modem data transfers. Historically, most of the system memory was directly controlled by the CPU because the CPU is responsible for tasks of arbitrary complexity (which includes memory management), though direct memory access between other cores is possible too. Typically, a CPU may allocate or reserve memory for e.g., data storage, program execution, a stack, a heap, etc. As shown, CPU allocations are quite generous relative to most other IP cores.

Current implementations of neural network engines are designed around server-based implementations that have access to near limitless memory, processing bandwidth, and/or power. Embedded devices that seek to add neural network functionality would ideally bring neural network acceleration on-die for power and performance reasons. Unfortunately, the memory requirements needed to do so are substantial; for embedded devices, this may be a prohibitive amount of silicon real estate.

Exemplary Neural Network IP Core

Figure 3:
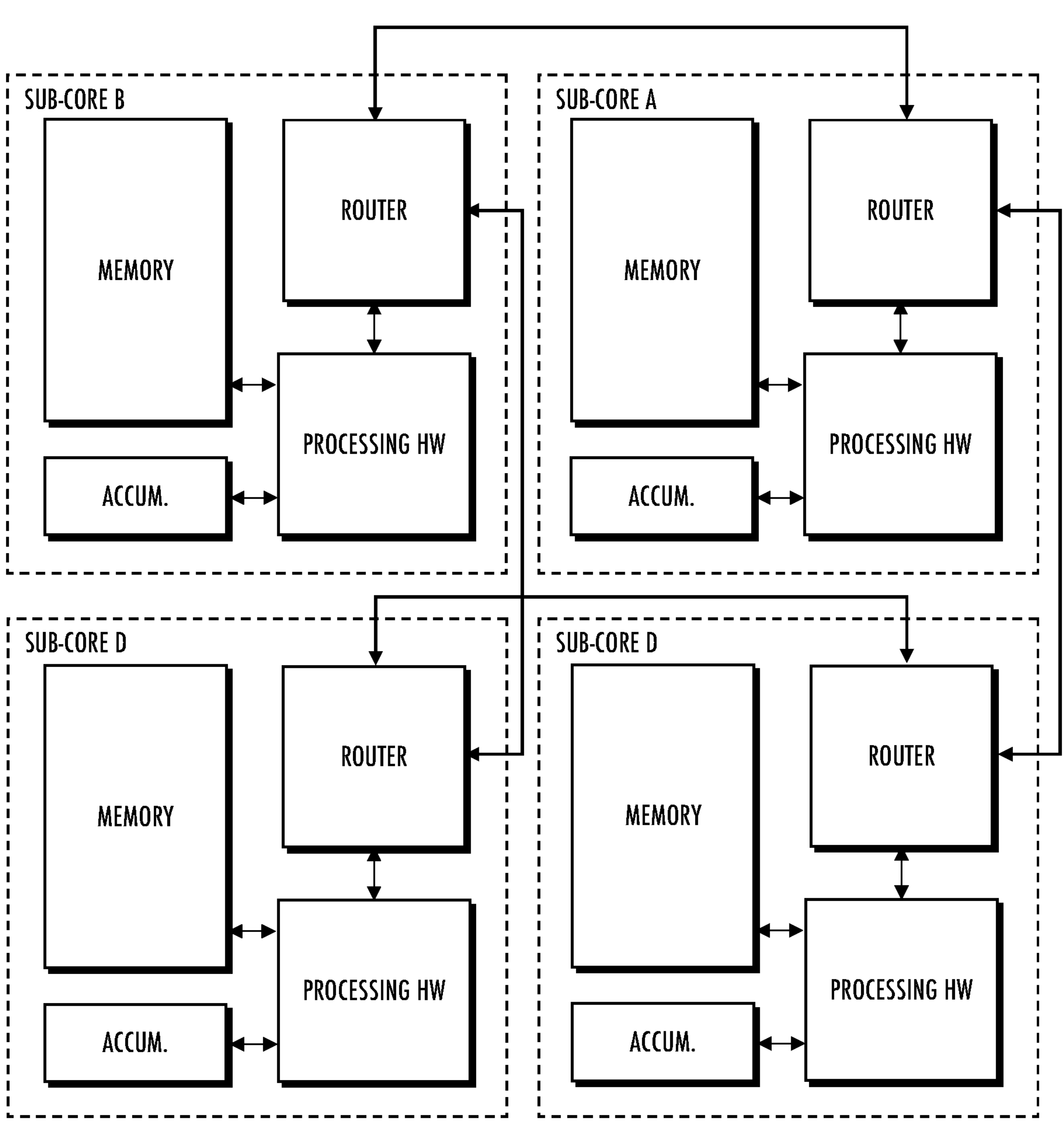
FIG. 3 is a graphical representation of one exemplary neural network intellectual property (IP) core, useful in conjunction with the various principles described herein

FIG. 3 is a graphical representation of one exemplary neural network intellectual property (IP) core, useful in conjunction with the various principles described herein. As shown, the neural network IP core does not use an external memory to store the neural network data structures nor any intermediate results. Instead, the neural network IP core is composed of a number of smaller sub-cores. Each sub-core includes its own processing hardware, working memory, accumulator, and router. Unlike existing neural network implementations which naïvely distribute processing load (discussed previously), the neural network IP core decouples processing among its constituent sub-cores. In one aspect of the present disclosure, neural network processing is mathematically transformed (mapped) and spatially partitioned into dense "neighborhood" processing and sparse "global" communications processing (see e.g., U.S. patent application Ser. No. 17/367,512 filed Jul. 5, 2021, and entitled "METHODS AND APPARATUS FOR LOCALIZED PROCESSING WITHIN MULTICORE NEURAL NETWORKS", previously incorporated herein by reference in its entirety). The principles described therein can be extended to sub-core implementations; e.g., each sub-cores' mapping/partitioning may be based on the physical silicon gate connectivity; in other words, processing hardware and memories transactions may be mapped/partitioned for on-die communication. The mapping/partitioning preserves the properties of the original global neural network at a fraction of the memory accesses.

As shown in FIG. 3, the local neighborhood weights and each sub-core's subset (or "slice") of the global network weights are stored in the sub-core's memory. During operation, applicable weights are retrieved from the corresponding memory for computation; intermediate results may be stored within a working memory and/or accumulator.

Figure 4:
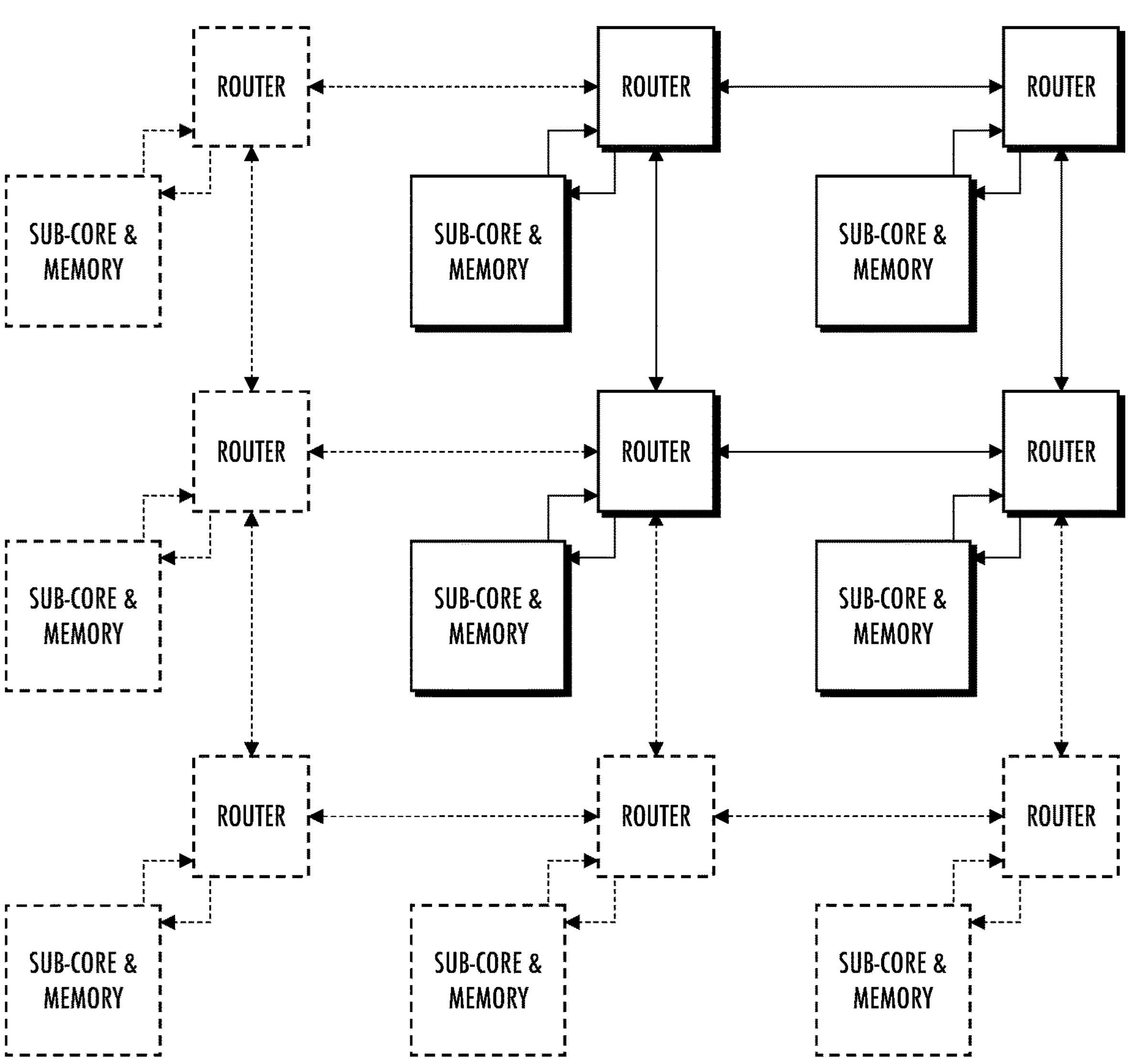
FIG. 4 is a graphical representation of the extensible nature of the neural network intellectual property (IP) core, in accordance with the various principles described herein.

While the illustrated embodiment is shown in the context of four (4) sub-cores emulating a global neural network of nodes, the exemplary neural network IP core may be broadly extended to any number of sub-cores and/or any number of nodes (see e.g., FIG. 4). Additionally, sub-core resources may be symmetrically or asymmetrically distributed. In a symmetric distribution, each sub-core may have a fixed relation of memory banks to processing hardware (e.g., 1 core has 4 data paths, and 8 banks of memory). Other implementations may use asymmetric sub-core configurations with equal success. Partitioning may be scaled to an individual sub-core's capabilities and/or application requirements. For example, asymmetric systems may enable high performance sub-cores (more logic, memory, and/or faster clock rates) and low power sub-cores (less logic, less memory, and/or power efficient clocking). In such implementations, matrix operations may be sized to complete within operational constraints, given a sub-core's capabilities. Furthermore, any consolidation, division, distribution, agglomeration, and/or combination of processing hardware and/or memory may be substituted by artisans of ordinary skill in the related arts, given the contents of the present disclosure.

Figure 5:
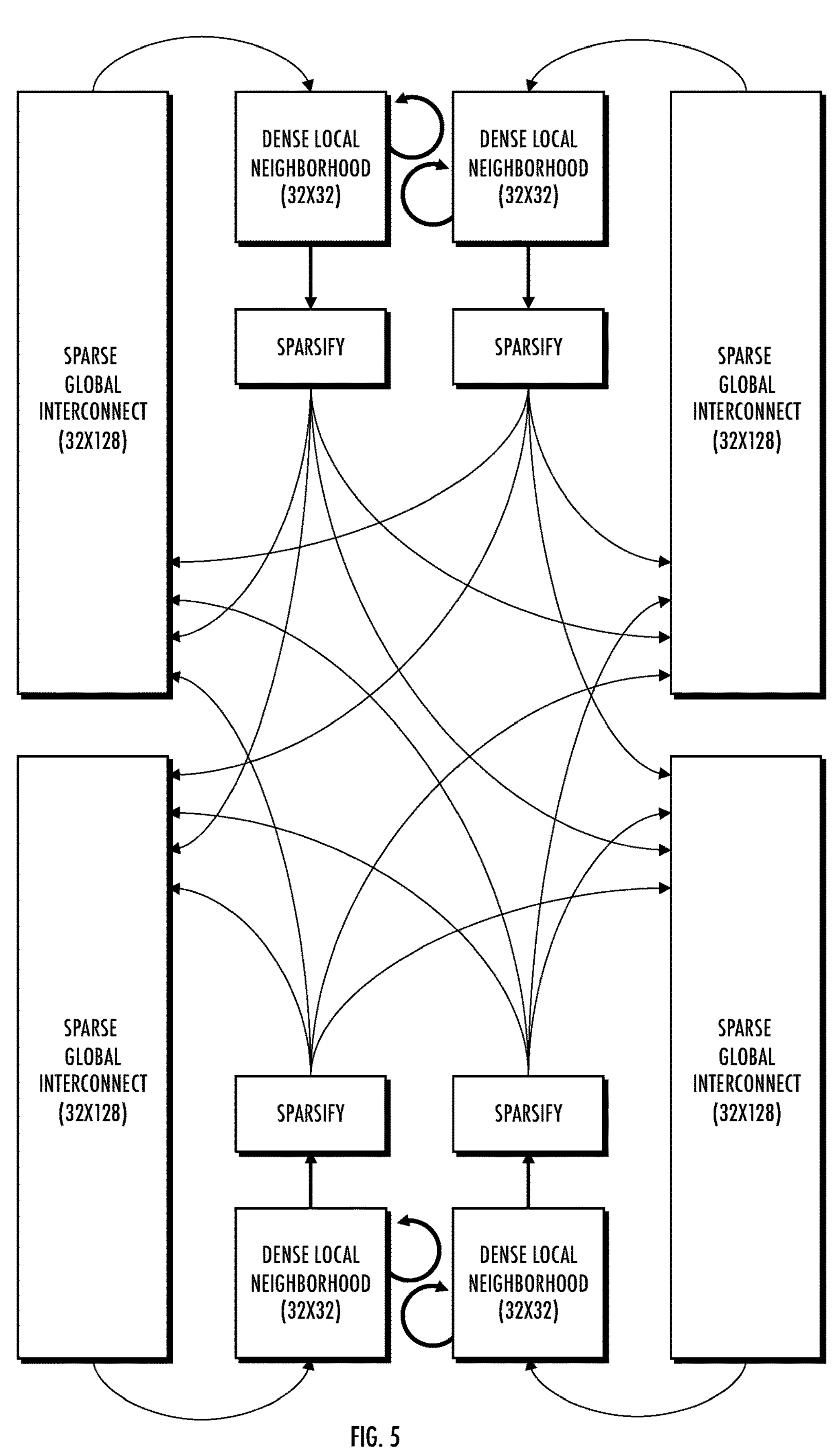
FIG. 5 is a logical block diagram illustrating the data traffic flow through an exemplary neural network IP core.

FIG. 5 is a logical block diagram illustrating the data traffic flow through the exemplary neural network IP core. Each neighborhood is characterized by a locally dense neural network. Neighborhoods are connected via a global interconnect matrix to the other neighborhoods; the output of the neighborhoods can be further sparsified prior to global distribution via interconnect logic.

Notably, there are overhead costs associated with compression, and different techniques have different costs and benefits. Since vectors and matrices are used differently in neural network processing, these data structures may be represented differently to further enhance performance. For example, as discussed in U.S. patent application Ser. No. 17/367,517 filed Jul. 5, 2021, and entitled "METHODS AND APPARATUS FOR MATRIX AND VECTOR STORAGE AND OPERATIONS", previously incorporated herein by reference in its entirety, sparse neural network data structures may be compressed based on actual, non-null, connectivity (rather than all possible connections). The principles described therein can be extended to sub-core implementations to greatly reduce storage requirements as well as computational complexity. In some variants, the compression and reduction in complexity is sized to fit within the memory footprint and processing capabilities of a sub-core. The exemplary compression schemes represent sparse matrices with links to compressed column data structures, where each compressed column data structure only stores non-null entries to optimize column-based lookups of non-null entries. Similarly, sparse vector addressing skips nulled entries to optimize for vector-specific non-null multiply-accumulate operations.

Additionally, existing neural network processing relies on a centralized task scheduler that consumes significant processing and transactional overhead to coordinate between sub-cores. In contrast, the sparse global communications between sub-cores of the exemplary neural network IP core decouples neighborhood processing and enables the neural network IP core to asynchronously operate the sub-cores in parallel. Consequently, optimized variants may distribute task coordination between sub-cores and implement asynchronous handshaking protocols between sub-cores. For example, as discussed in U.S. patent application Ser. No. 17/367,521 filed Jul. 5, 2021, and entitled "METHODS AND APPARATUS FOR THREAD-BASED SCHEDULING IN MULTICORE NEURAL NETWORKS", previously incorporated herein by reference in its entirety, thread-level parallelism and asynchronous handshaking are leveraged to decouple core-to-core dependencies. The principles described therein can be extended to sub-core-to-sub-core communications; e.g., each sub-cores' threads may run independently of one another, without any centralized scheduling and/or resource locking (e.g., semaphore signaling, critical path execution, etc.). Decoupling thread dependencies allows sub-cores to execute threads asynchronously. In one such implementation, the neural network IP core includes a set of distributed sub-cores that run in parallel. The sub-cores communicate with each other via an interconnecting network of router nodes. Each sub-core processes its threads asynchronously with respect to the other sub-cores. Most threads correspond to the dense neighborhood, and the sub-cores can process these threads independently of the other sub-cores. Global communication is sparse (infrequent) and is handled via an asynchronous handshake protocol.

The exemplary neural network intellectual property (IP) core described herein enables neural network operation at a substantial reduction in memory footprint and processing complexity when compared to other neural network solutions. Even so, a modest neural network IP core might require 1.5 Mb of memory; this is still a substantial commitment for embedded devices that may have only 2 Mb of total system memory.

There are a few observations regarding the unique operation of the exemplary neural network IP core which should be expressly noted. Each sub-core's processing hardware is synthesized, mapped, and placed such that its physical construction (at transistor gate level) has direct access to its memories. Directly coupling the processing hardware to the memory allows for custom configurations, such as e.g., non-standard bus widths, timing, latency/throughput, switching patterns, packet format, timing, address/data signaling, etc. Additionally, placing the memory next to the processing hardware greatly reduces physical transmission time and energy costs.

Furthermore, the exemplary neural network intellectual property (IP) core is mostly memory; one prototype implementation uses nearly 93% of its transistor real estate on memory gates. In one exemplary implementation, each bit of on-die memory is implemented as static random-access memory (SRAM) cells (e.g., using 6 transistors to create a flip-flop). While dynamic random-access memory (DRAM) cells (e.g., using 1 transistor and capacitive storage) can provide much higher memory density, they impose restrictions on data accesses and system design. For example, DRAMs are typically on a separate chip due to their capacitive construction, and communication between chips incurs significant communication overhead. DRAMs also require periodic refresh of their capacitive state.

Moreover, each of the sub-cores operates independently of the other sub-cores; each sub-core may be operated asynchronously from other sub-cores. In some implementations, this can be used to dynamically assign threads to sub-cores based on considerations such as e.g., power consumption, performance, latency, etc. In other words, a single sub-core could execute four threads, two sub-cores could execute two threads apiece, four sub-cores could each execute one of the four threads, etc.

Exemplary Multi-Purpose Neural Network Core and System Memory

Figure 6:
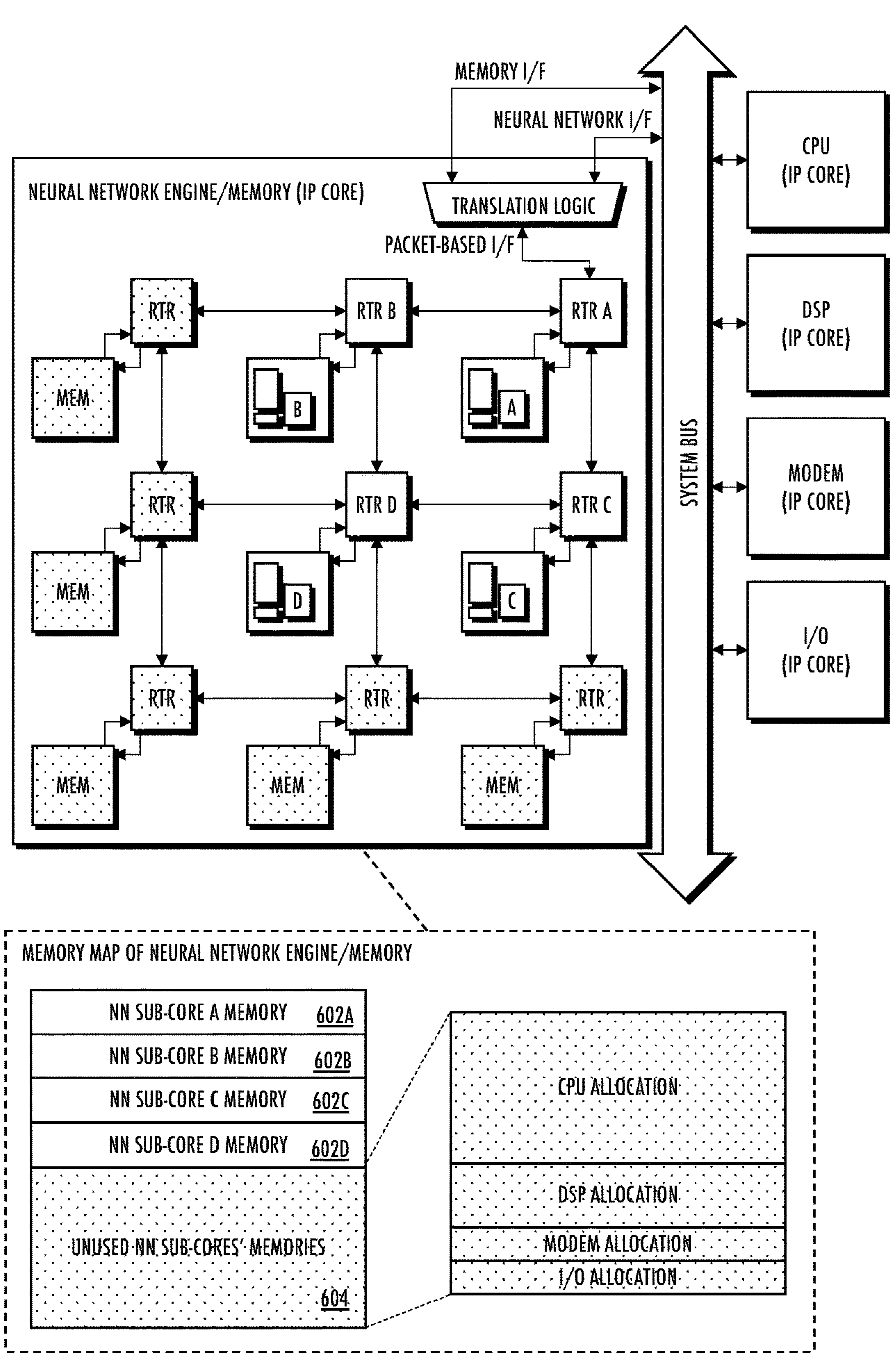
FIG. 6 is a graphical representation of one exemplary multi-purpose neural network intellectual property (IP) core, in accordance with the various principles described herein.

FIG. 6 is a graphical representation of one exemplary multi-purpose neural network intellectual property (IP) core, in accordance with the various principles described herein.

In one exemplary embodiment, the asynchronous/parallel nature of neural network tasks may allow a neural network IP core to dynamically switch between: a system memory (in whole or part), a neural network processor (in whole or part), and/or a hybrid of system memory and neural network processor. As shown, the multi-purpose neural network IP core has partitioned its sub-cores into a first set of neural network sub-cores, and a second set of memory sub-cores that operate as addressable memory space. In one specific implementation, sub-cores may be statically assigned at "compile-time." In other implementations, partitioning may be dynamically assigned at "run-time", or semi-statically assigned at "program-time" (e.g., the sub-cores are assigned at run-time, but do not change for the duration of the program, etc.). Any number of considerations may be used to partition the sub-cores; examples of such considerations may include, without limitation: thread priority, memory usage, historic usage, future usage, power consumption, performance, etc.

In one embodiment, the partition may be dynamically adjusted based on neural network and/or memory activity. Consider the scenario where four sub-cores are used to execute four active neural network threads; the remaining sub-cores are allocated to system memory. If a fifth thread is woken up, then the fifth thread may be queued for execution in one of the four neural network sub-cores. Alternatively, one of the memory sub-cores may be switched to its neural network state, and the fifth thread may be assigned to the newly activated sub-core. Similarly, if a neural network sub-core is underutilized, it may be released from the neural network and added to the set of memory sub-cores. In some cases, a third set of sub-cores may be held in "reserve" to dynamically shift between neural network and memory modes. Reserving sub-cores for allocation on an as-needed basis may improve flexibility, reduce unnecessary sub-core churn, and/or minimize resource management overhead. In yet another alternative embodiment, the sub-core's memory may be further partitioned (e.g., where the sub-core may only use a subset of its memory banks, it could provide the surplus back to the system.)

In the illustrated embodiment, the sub-cores are connected via router nodes. Each router node sends and receives packets of data; the data packets include an address, data payload, and handshake signaling (for asynchronous router communication). The address field may identify an address or range of addresses within e.g., another router node, the neural network memory map (on the system bus), or the addressable memory space. The data payload may be variable length (for neural network operation), or fixed width (for addressable memory space). In some cases, the packets of data may additionally include other formatting and/or control signaling (e.g., parity bits, cyclic redundancy checks, forward error correction, packet numbering, etc.)

In one exemplary implementation, the router nodes use an asynchronous packet protocol to manage communications between sub-cores without requiring any shared timing. Router-based access and asynchronous handshaking allow for much more flexibility in manufacturing and operation. In other words, the number of sub-cores that can be supported is not limited by manufacturing tolerances and/or timing analysis.

During operation, a transmitter node opens a channel to a receiver node. When the channel is active, packet transactions can be handled via an asynchronous serial link. When the channel is not active, no data can be transferred. In one exemplary embodiment, the router nodes are directly coupled to neighboring routers via unidirectional links to avoid bus arbitration. For example, a first serial link connects translation logic to router A, a second and third link connect router A to routers B and C, respectively. In order for router A to deliver a packet to router D, at least one intermediary node (e.g., router B or C) must forward the packet. By linking together multiple hops and packet addressing logic (e.g., a routing table), routers can provide access to any other node of the neural network IP core.

As used herein, the term "node" refers to a sub-core, translation logic, or other entity that is a logically addressable entity of the neural network IP core. While the present disclosure is presented in the context of unidirectional links, other routing schemes that use a shared internal bus and contention-avoidance logic may be substituted with equal success. Artisans of ordinary skill in the related arts will readily appreciate that the techniques and mechanisms described herein may be extended to bidirectional, multi-directional, and broadcast-based systems.

In one exemplary embodiment, the asynchronous packet protocol comprises a series of handshakes. For example, the packet protocol may include: a start handshake that initiates communication command, one or more data handshakes for each data packet, and an end handshake that terminates communication. Each handshake may entail a request signal, and an acknowledge/grant signal.

In one specific implementation, the packet protocol is asynchronous (relying on a handshake rather than a shared clock), however the physical transmission may be synchronous (based on a shared clock). For example, each bit of the data payload may be transmitted serially using a clock and single-rail signaling (a single rail transmits both "1" and "0"). Alternatively, asynchronous physical transmission may use dual-rail signaling (i.e., one line for "1", one rail for "0") with send/receive logic and/or clock gating.

Referring back to FIG. 6, the memories of each sub-core are synthesized, mapped, and placed such that their physical construction (at transistor gate level) has direct access to the processing hardware. As a brief aside, neural network processing is based on vector-matrix operations of sparse data structures; both sparse matrices and sparse vectors are variable length data structures that may skip nulled entries. Additionally, the local and global weights may be significantly smaller, but far more numerous, than the accumulated results. As a result, the memories of each sub-core may be physically constructed such that many short bit width neural network weights (e.g., 4-bits, 8-bits) could be used with a fewer number of large bit width working memory and accumulators (e.g., 16-bits, 32-bits, etc.). Matching SRAM memory bit widths wherever possible to their attached logic allows for proportionally smaller footprints, reduced power, increased performance, etc. As another important benefit, internally each sub-core has a known (e.g., single cycle) access to memory that can be used to optimize control and arithmetic logic (e.g., via pipelining). In other words, direct access allows the memories to be sized according to the most efficient use of processing hardware resources.

Unlike neural network processing, system-wide addressable memory space is used for a variety of different tasks. Rather than optimizing for memory space and/or performance, system-wide addressable memory is standardized to a generically accepted format that every IP core can use. Notably, generic memory bus protocols (such as AMBA/AXI, PCI/PCIe, TileLink, etc.) are designed to support many different applications across a wide variety of design constraints. In some cases, memory may be provided by bulk memory technologies (e.g., DRAM, SSD, or even HDD) which operate at much slower speeds than on-die SRAM. Consequently, system-wide addressable memory is usually large bit width (e.g., 32-bits, 64-bits, etc.) and access latency may be quite slow (in most situations, an unknown number of cycles for accesses).

In some cases, memory busses support long latency high throughput reads; for example, the AMBA/AXI interface has no specified memory return timing. During operation, a processor may request a memory read, then shift to other tasks; later the processor will receive a notification once the data is ready for reading. Similarly, posted memory writes allow a processor to "post" a write, receive an immediate completion response, and write again (also referred to as a "zero wait state write"); the memory internally handles write hazards which allows the processor to tightly pipeline its write sequences.

Protocol translation between the neural network IP core and system-wide bus occurs within the translation logic. In one exemplary embodiment, the translation logic presents two different protocols: a first neural network protocol that may be used to access the neural network cores, and a second addressable memory space that provides access to the memories of the memory sub-cores. In the illustrated embodiment of FIG. 6, the memory map is contiguously partitioned, however it is appreciated that other implementations may intersperse neural network cores with the addressable memory space. In very large networks, the translation logic may need to account for roundtrip delay when partitioning/assigning sub-cores to system memory. In other words, strict timing requirements may impose a maximum number of hops on memory sub-cores.

Each router node internally controls access to its corresponding sub-core's memories and processing hardware. The router node performs packet processing based on its assigned mode; for example, if the sub-core has been assigned to the first set of neural network sub-cores, then data packets may be of variable length and may correspond to processor control path and/or data path instructions. Consider a scenario where the router may receive a ready instruction (RDY) indicating that another sub-core is requesting data; responsively, the router may wake and update the processing hardware registers and send the requested data (SEND) to the requesting sub-core. As another such example, if the sub-core has been assigned to the second set of memory sub-cores that operate as addressable memory space, then the router will access the local memories according to the addressable memory space configuration. This may entail reading and writing to the local memories within system bus constraints e.g., a fixed bit width and/or necessary timing.

In one exemplary embodiment, the translation logic reads from, and writes to, the various memories of the memory sub-cores using the router protocols (e.g., packet-based communication). In some variants, the translation logic may have a predefined memory map (i.e., a routing map/table) based on the available memory sub-cores; in other variants, the translation logic tracks memory sub-cores as they are allocated/deallocated from the memory map.

Translation logic may be implemented as dedicated hardware, firmware, software, or some hybrid of the foregoing. As shown, the translation logic includes three (3) distinct interfaces: a memory interface, a neural network interface, and a packet-based interface. The memory interface and the neural network interface may correspond to distinct memory ranges that are addressable on the system bus. The packet-based interface transacts data packets with one or more sub-cores of the neural network IP core. Data packets are routed through the network of sub-cores to their respective destination sub-cores according to the sub-core addressing, as discussed above.

In the illustrated embodiment, the system bus allocates: the first neural network sub-core A to a first memory address range (i.e., memory range 602A), the second neural network sub-core B to memory range 602B, the third neural network sub-core C to memory range 602C, the fourth neural network sub-core D to memory range 602D, etc. The remaining unused neural network cores may be allocated to system memory (memory range 604); depending on system needs, memory range 604 may be flexibly allocated to e.g., CPU, DSP, modem, I/O, etc.

In one exemplary implementation, the translation logic includes glue logic to re-format the router packet protocol to the system-wide bus protocol and vice versa. For example, the eight 4-bit or four 8-bit packet payloads may be concatenated to construct a 32-bit word for the system bus. Similarly, system bus 32-bit word may be split or portioned to create smaller packet payloads. In some cases, different width memories may be combined e.g., two 4-bit, one 8-bit, one 16-bit, etc. In one such variant, mask bits may be used to ensure that only intended memory locations are read/written to; a first register may identify the mask bits and a second register might identify the payload. For example, setting 24 mask bits of a 32-bit word would ensure that only the unmasked 8 bits are read/written. In other implementations, the neural network memory range may be word aligned according to the system bus; in other words, the system bus could write to a first value (4-bit, 8-bit, 16-bit) using 32-bit words, the remaining bits are ignored. While masking provides more flexibility and reduces memory footprint, word-aligned treatment is often more efficient for random accesses.

As another example, system bus addressing may be a logically contiguous address space (e.g., memory range 602C follows memory range 602B), however sub-core addresses may be based on internal physical layouts which are non-contiguous (e.g., sub-core C is not adjacent to sub-core B). As a result, the translation logic may include routing tables and/or internal mapping to map sub-cores to memory maps. More generally, the translation logic may additionally provide glue logic to comply with AXI signals: e.g., ACLK, ARESETn, WDATA, RDATA, RREADY, WREADY, etc. In one specific implementation, formatting conforms to the *AMBA AXI and ACE Protocol Specification, Issue H.c*. published Jan. 26, 2021, incorporated herein by reference in its entirety.

Figure 7:
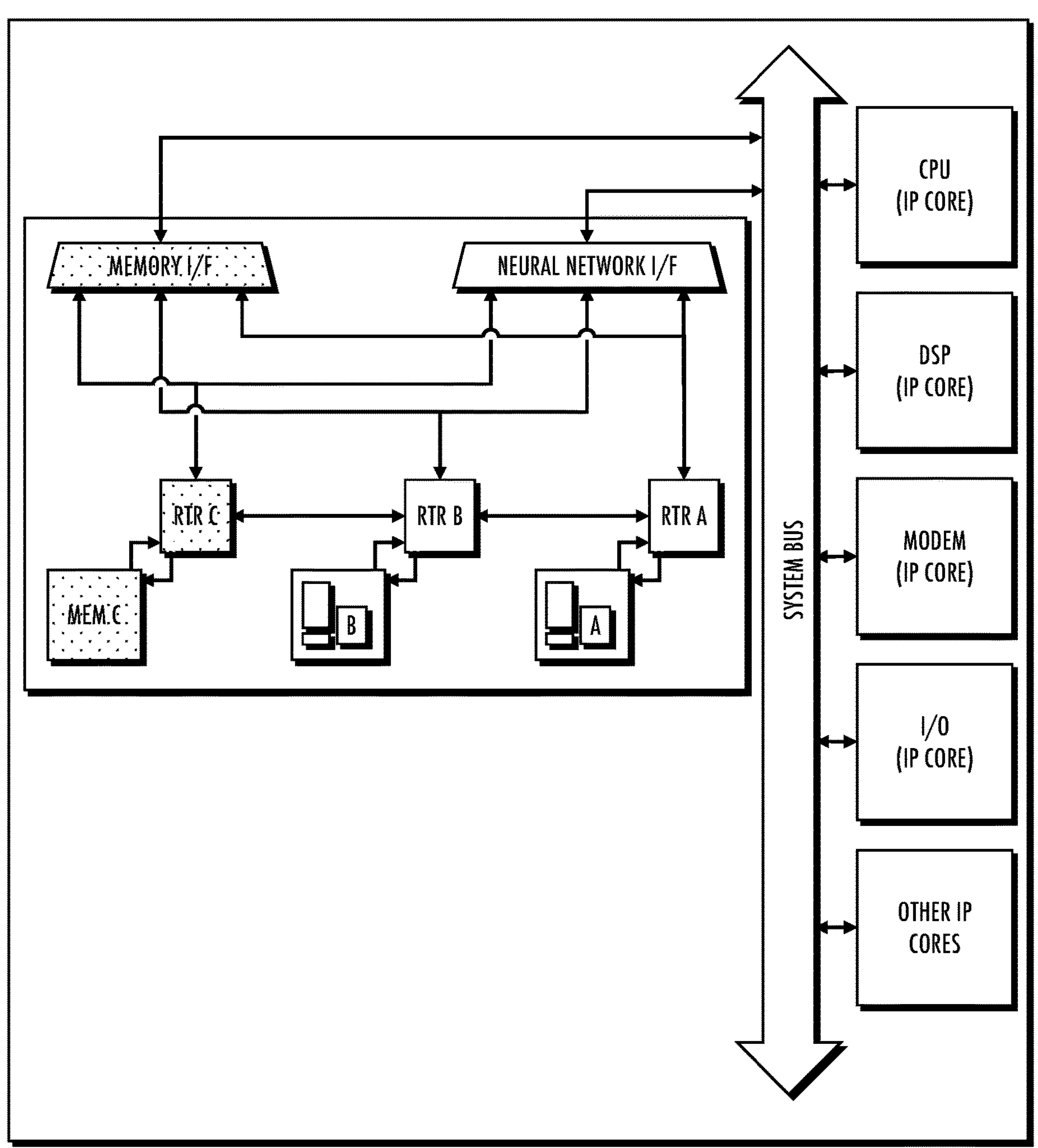
FIG. 7 illustrates a direct-access variation of a multi-purpose neural network intellectual property (IP) core, in accordance with various aspects of the present disclosure.

FIG. 7 illustrates a direct-access variation, in accordance with various aspects of the present disclosure. The direct-access variant provides a first neural network interface that provides access to the neural network sub-cores, and a second memory interface that provides access to the memories of the memory sub-cores. The direct-access embodiment may provide the benefits of physical memory access (security, speed, etc.), however since physical routing scales as a function of sub-cores, internal wiring and/or gate costs may be higher. Such implementations may be particularly useful where fixed latencies and/or higher memory access speeds are desirable.

System Architecture

Figure 8:
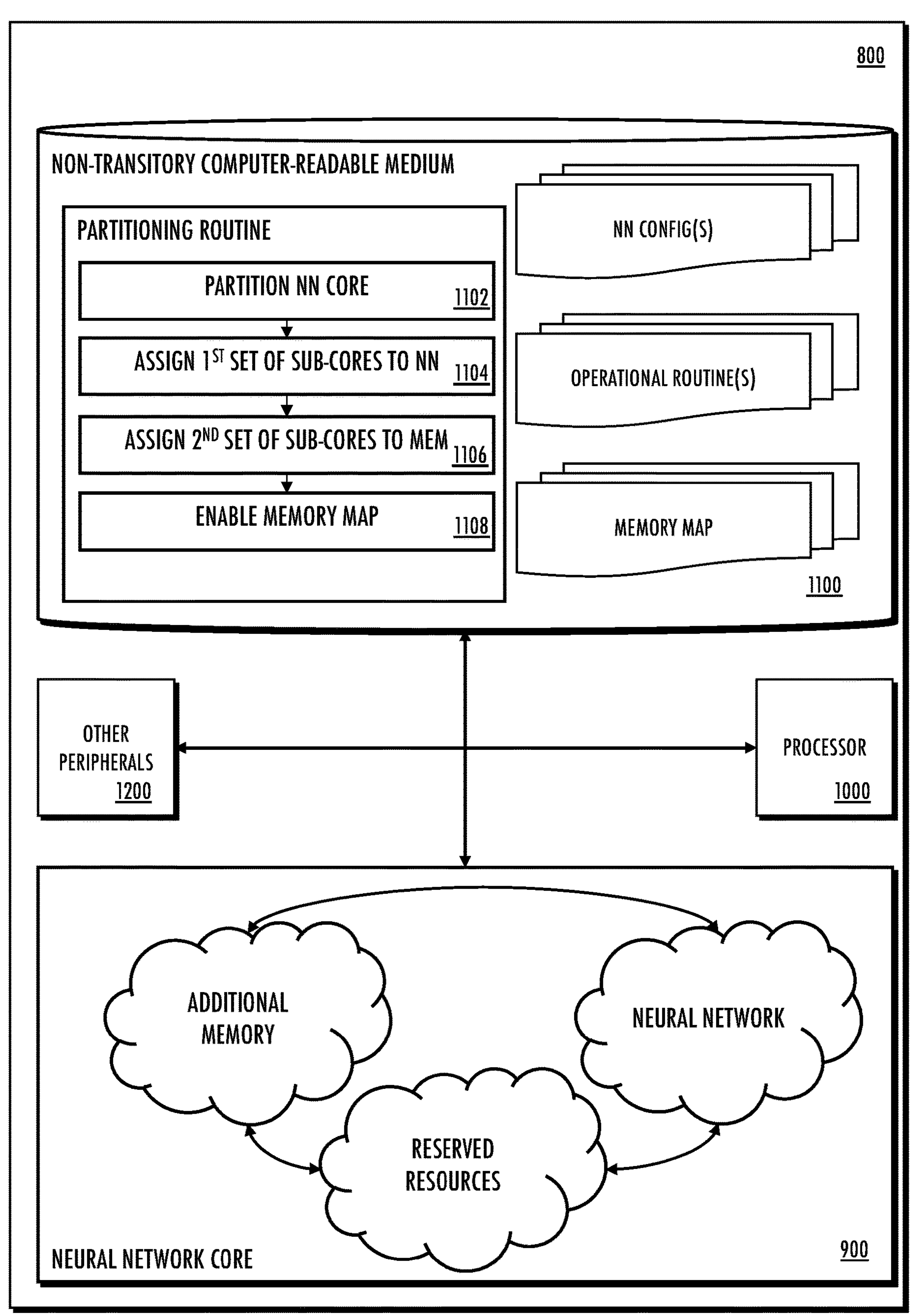
FIG. 8 is a graphical representation of one generalized apparatus, in accordance with the various principles described herein.

FIG. 8 is a logical block diagram of one generalized apparatus 800, useful in accordance with the various principles described herein. The apparatus Boo includes: a neural network subsystem 900, a processor 1000, a non-transitory computer-readable medium 1100, peripherals 1200 (if any), and a system bus to connect them. The neural network subsystem 900 includes a "pool" of nodes that may be logically partitioned into different functions according to one or more neural network configurations. The processor 1000 implements logic to control the operation of the apparatus Boo (which may include one or more data manipulations). The non-transitory computer-readable medium (also referred to throughout as "memory") stores instructions and data for the various components of the apparatus Boo. For example, the processor 100 may fetch instructions from memory to perform data manipulations, etc. In some variants, the apparatus Boo may include other peripherals 1200 (e.g., IP cores, input/output (I/O), network and data interfaces, and/or any other peripheral logic).

While the present discussion describes a system-on-a-chip (SoC), the principles described throughout have broad applicability to other semiconductor devices and/or design techniques. Such devices may include, e.g., processors and other instruction processing logic (e.g., CPU, GPU, DSP, ISP, NPU, TPU, etc.), application specific integrated circuitry (ASIC) and other hardware-based logic, field-programmable gate array (FPGA) and other programmable logic devices, and/or any hybrids and combinations of the foregoing.

Furthermore, while the present discussion is presented in the context of a neural network intellectual property (IP) core, the techniques may be broadly applicable to any pool of logic that can be flexibly allocated and/or partitioned for use. As used herein, the term "pool" and its linguistic derivatives refer to a supply of fungible resources that may be allocated to one or more logical processes. Resource pooling may be useful in machine learning, image/audio media processing, cryptography, data networking, data mining and/or highly parallelized processing.

In one exemplary embodiment, the processor 1000 executes instructions from the non-transitory computer-readable medium 1100 during an initialization state to partition the pool of nodes for operation according to a neural network configuration. Once the apparatus has completed the partitioning routine, the apparatus Boo enters an operational state. During the operational state, the processor 100 (and other peripherals 1200 (if present)) may use the first set of neural network nodes as an accelerator for machine learning algorithms. The second set of memory nodes may be used as additional memory. In some variants, a third set of nodes may also be reserved for run-time/program-time allocation (e.g., to be switched into operation as-needed).

The following discussion provides functional descriptions for each of the logical entities of the generalized apparatus 800. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the generalized apparatus Boo is separately provided below.

Overview of Neural Network Subsystem

The following discussion provides a specific discussion of the internal operations, design considerations, and/or alternatives, for the exemplary neural network subsystem 900.

Neural Network Subsystem: Translation Logic

As a brief aside, there are many different types of parallelism that may be leveraged in neural network processing. Data-level parallelism refers to operations that may be performed in parallel over different sets of data. Control path-level parallelism refers to operations that may be separately controlled. Thread-level parallelism spans both data and control path parallelism; for instance, two parallel threads may operate on parallel data streams and/or start and complete independently. Parallelism and its benefits for neural network processing are described within U.S. patent application Ser. No. 17/367,521 filed Jul. 5, 2021, and entitled "METHODS AND APPARATUS FOR THREAD-BASED SCHEDULING IN MULTICORE NEURAL NETWORKS", previously incorporated by reference in its entirety.

The exemplary neural network subsystem 900 leverages thread-level parallelism and asynchronous handshaking to decouple sub-core-to-sub-core data path dependencies of the neural network. In other words, neural network threads run independently of one another, without any centralized scheduling and/or resource locking (e.g., semaphore signaling, critical path execution, etc.). Decoupling thread dependencies allows sub-cores to execute threads asynchronously. In one specific implementation, the thread-level parallelism uses packetized communication to avoid physical connectivity issues (e.g., wiring limitations), computational complexity, and/or scheduling overhead.

Translation logic is glue logic that translates the packet protocol natively used by the sub-cores to/from the system bus protocol. A "bus" refers to a shared physical interconnect between components; e.g., a "system bus" is shared between the components of a system. A bus may be associated with a bus protocol that allows the various connected components to arbitrate for access to read/write onto the physical bus. As used herein, the term "packet" refers to a logical unit of data for routing (sometimes via multiple "hops") through a logical network—e.g., a logical network may span across multiple physical busses. The packet protocol refers to the signaling conventions used to transact and/or distinguish between the elements of a packet (e.g., address, data payload, handshake signaling, etc.).

To translate a packet to a system bus transaction, the translation logic converts the packet protocol information into physical signals according to the bus protocol. For example, the packet address data may be logically converted to address bits corresponding to the system bus (and its associated memory map). Similarly, the data payload may be converted from variable bit widths to the physical bit width of the system bus; this may include concatenating multiple payloads together, splitting payloads apart, and/or padding/deprecating data payloads. Control signaling (read/write) and/or data flow (buffering, ready/acknowledge, etc.) may also be handled by the translation logic.

To convert a system bus transaction to packet data, the process may be logically reversed. In other words, physical system bus data is read from the bus and written into buffers to be packetized. Arbitrarily sized data can be split into multiple buffers and retrieved one at a time or retrieved using "scatter-gather" direct memory access (DMA). "Scatter-gather" refers to the process of gathering data from, or scattering data into, a given set of buffers. The buffered data is then subdivided into data payloads, and addressed to the relevant logical endpoint (e.g., a sub-core of the neural network).

While the present discussion describes a packet protocol and a system bus protocol, the principles described throughout have broad applicability to any communication protocol. For example, some devices may use multiple layers of abstraction to overlay a logical packet protocol onto a physical bus (e.g., Ethernet), such implementations often rely on a communication stack with multiple distinct layers of protocols (e.g., a physical layer for bus arbitration, and a network layer for packet transfer, etc.).

Neural Network Subsystem: Pool of Sub-Cores

In one embodiment, each sub-core of the neural network includes its own processing hardware, local weights, global weights, working memory, and accumulator. These components may be generally re-purposed for other processing tasks. For example, memory components may be aggregated together to a specified bit width and memory range (e.g., a 1.5 Mb of memory could be re-mapped to an addressable range of 24K with 64 bit words, 48K with 32 bit words, etc.). In other implementations, processing hardware may provide, e.g., combinatorial and/or sequential logic, processing components (e.g., arithmetic logic units (ALUs), multiply-accumulates (MACs), etc.).

The exemplary sub-core designs have been optimized for neural network processing, however this optimization may be useful in other ways as well. For example, the highly distributed nature of the sub-cores may be useful to provide RAID-like memory storage (redundant array of independent disks), offering both memory redundancy and robustness. Similarly, the smaller footprint of a sub-core and its associated memory may be easier to floorplan and physically "pepper-in-to" a crowded SoC die compared to a single memory footprint.

As previously noted, each sub-core has its own corresponding router. Data may be read into and/or out of the sub-core using the packet protocol. While straightforward implementations may map a unique network address to each sub-core of the pool, packet protocols allow for a single entity to correspond to multiple logical entities. In other words, some variants may allow a single sub-core to have a first logical address for its processing hardware, a second logical address for its memory, etc.

More directly, artisans of ordinary skill in the related arts given the contents of the present disclosure will readily appreciate that the logical nature of packet-based communication allows for highly flexible logical partitioning. Any sub-core may be logically addressed as (one or more of) a memory sub-core, a neural network sub-core, or a reserved sub-core. Furthermore, the logical addressing is not fixed to the physical device construction and may be changed according to a compile-time, run-time, or even program-time considerations.

Overview of Processor and Memory

The following discussion provides a specific discussion of the internal operations, design considerations, and/or alternatives, for the processor and non-transitory computer-readable medium 1100 subsystems.

Processor Considerations

Processors (such as processor 1000) execute a set of instructions to manipulate data and/or control a device. Artisans of ordinary skill in the related arts will readily appreciate that the techniques described throughout are not limited to the basic processor architecture and that more complex processor architectures may be substituted with equal success. Different processor architectures may be characterized by e.g., pipeline depths, parallel processing, execution logic, multi-cycle execution, and/or power management, etc.

Typically, a processor executes instructions according to a clock. During each clock cycle, instructions propagate through a "pipeline" of processing stages; for example, a basic processor architecture might have: an instruction fetch (IF), an instruction decode (ID), an operation execution (EX), a memory access (ME), and a write back (WB). During the instruction fetch stage, an instruction is fetched from the instruction memory based on a program counter. The fetched instruction may be provided to the instruction decode stage, where a control unit determines the input and output data structures and the operations to be performed. In some cases, the result of the operation may be written to a data memory and/or written back to the registers or program counter. Certain instructions may create a non-sequential access which requires the pipeline to flush earlier stages that have been queued, but not yet executed. Exemplary processor designs are also discussed within U.S. patent application Ser. No. 17/367,517 filed Jul. 5, 2021, and entitled "METHODS AND APPARATUS FOR MATRIX AND VECTOR STORAGE AND OPERATIONS", and U.S. patent application Ser. No. 17/367,521 filed Jul. 5, 2021, and entitled "METHODS AND APPARATUS FOR THREAD-BASED SCHEDULING IN MULTICORE NEURAL NETWORKS", previously incorporated by reference in their entireties.

As a practical matter, different processor architectures attempt to optimize their designs for their most common usages. More specialized logic can often result in much higher performance (e.g., by avoiding unnecessary operations, memory accesses, and/or conditional branching). For example, an embedded device may have a processor core to control device operation and/or perform tasks of arbitrary complexity/best-effort. This may include, without limitation: a real-time operating system (RTOS), memory management, etc. Typically, such CPUs are selected to have relatively short pipelining, longer words (e.g., 32-bit, 64-bit, and/or super-scalar words), and/or addressable space that can access both local cache memory. More directly, the processor may often switch between tasks, and must account for branch disruption and/or arbitrary memory access.

Other processor subsystem implementations may multiply, combine, further subdivide, augment, and/or subsume the foregoing functionalities within other processing elements. For example, other peripherals 1200 (described below) may be used to accelerate specific tasks (e.g., a DSP may be used to process images, a codec may be used to perform media compression, a modem may be used to transmit media, etc.).

Memory Operation

Referring back to FIG. 8, the non-transitory computer-readable medium 1100 may be used to store data. In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., a partitioning routine and/or other operational routines) and/or program data (e.g., neural network configurations). In some variants, program code and/or program data may be further organized for dedicated and/or collaborative use. For example, the processor 100 and one or more other peripherals 1200 may share a common memory buffer to facilitate large transfers of data.

In one embodiment, the program code includes instructions that when executed by the processor 100 cause the processor 100 to perform tasks that may include: configuration of the neural network subsystem 900, memory mapping of the memory resources (which may include some portions of the neural network subsystem 900), and control/articulation of the other peripherals 1200 (if present). In some embodiments, the program code may be statically stored within the apparatus Boo as firmware. In other embodiments, the program code may be dynamically stored (and changeable) via software updates. In some such variants, software may be subsequently updated by external parties and/or the user, based on various access permissions and procedures.

When executed by the processor 1000, the partitioning routine causes the apparatus Boo to: partition a neural network core into a first set of neural network sub-cores and a second set of memory sub-cores; assign a first range of memory addresses to the neural network core based on the first set of neural network sub-cores; assign a second range of memory addresses to system-wide memory based on the second set of memory sub-cores; and enable the first range of memory addresses and the second range of memory addresses. The following discussion provides a specific discussion of the steps performed during the partitioning routine.

Referring now to a first step 1102, the neural network core is partitioned into a first set of neural network sub-cores and a second set of memory sub-cores. In one embodiment, the partitioning is logically implemented via network addressing. For example, a first set of sub-cores may be assigned for neural network processing, and a second set of sub-cores may be assigned for memory. In one variant, a third set of sub-cores may be reserved for subsequent assignment. Since each sub-core has a corresponding router (and one or more logical network addresses), the logical partitioning may be stored as addresses in routing tables.

In one exemplary embodiment, the logical partition is determined at compile-time. Compile-time embodiments may be optimized ahead of time and retrieved during run-time as compiled binaries. In some cases, compile-time variants may additionally optimize neural network addressing and/or memory mapping to optimize for physical placement and/or floor planning. For example, certain neural network nodes may be closely grouped to minimize network routing and/or certain memory nodes may be placed to reduce access time latency to the system bus.

In other embodiments, the logical partition may be determined at run-time (or program-time) based on a number of neural network threads, a change to thread priority, a memory usage, a historic usage, a predicted usage, a power consumption, or a performance requirement. For example, N threads may be assigned to M sub-cores based on power and/or performance considerations. An equal assignment of sub-cores to threads may minimize memory churn (e.g., inefficient memory accesses, etc.). Oversubscribed partitions (more threads than sub-cores) may reduce the number of powered sub-cores—this may enable more power-efficient operation at reduced performance. Undersubscribed partitions (more threads than sub-cores) may improve performance up to a point but consume more power.

In some variants, run-time implementations may collect operational metrics on physical placement and/or floor planning to improve performance over each iteration (e.g., trial-and-error). In some cases, run-time implementations may reserve sub-cores for dynamic run-time allocation. For example, sub-cores may be allocated to improve performance (at higher power) or deallocated to improve power (at lower performance). In some cases, allocations and deallocations may be triggered by thread status (sleep and wake states). In other cases, allocations and deallocations may be triggered by holistic device considerations (e.g., system memory bus bandwidth, processor idle time, remaining battery life, etc.).

Once partitioned, the translation logic of the neural network core is assigned logical network addresses and physical system bus addresses (step 1104). For example, a first range of memory addresses may be assigned to the neural network core based on the first set of neural network sub-cores. Each sub-core may expose (to, e.g., the processor 100) one or more of its: processing hardware configuration, local weights, global weights, working memory, and accumulator locations. The processor 100 may be able to e.g., write new local weights, read accumulator results, etc. by reading and writing to the corresponding areas of the memory map. In some cases, the memory map may group all local weights of the neural network within one address range, all the global weights neural network within another address range, etc. This may optimize system bus operation for bulk reads/writes, since it may be inefficient to "skip" through the memory map to e.g., write the local weight for a first sub-core, then a second sub-core, etc.

In some cases, the memory map may have access restrictions. For example, some areas of the sub-core may not be mapped. Other implementations may restrict access to certain entities (e.g., the processor 1000 may have write access while other peripherals 1200 may have limited read access, etc.).

Similarly, a second range of memory addresses is assigned to system-wide memory based on the second set of memory sub-cores (step 1106). System-wide memory may map memory sub-cores to physical system bus addresses. In some cases, the physical system bus addresses may additionally include timing, latency, and/or throughput restrictions to ensure the internal neural network routing complies with system expectations.

Once the memory map has been updated with the first range of memory addresses and the second range of memory addresses, the processor 100 may enable memory map operation (step 1108.) In one exemplary embodiment, the neural network and/or memory sub-cores are taken out of reset which enables internal packet addressing logic. Additionally, the translation logic may enable the memory interface, the neural network interface, and the packet-based interface, thus allowing system bus access to the sub-cores. More directly, the translation logic converts system bus accesses to the neural network interface (at the first range of memory addresses) and/or memory interface (at a second range of memory addresses) into corresponding packets for transfer via the packet-based interface, and vice versa. In some variants, reserved sub-cores may be kept in reset; alternatively, reserved sub-cores may be enabled for routing but otherwise inaccessible externally.

Overview of Other Peripherals

The various techniques described herein may be used with a variety of different peripheral intellectual property cores.

The following discussion provides an illustrative discussion of the internal operations, design considerations, and/or alternatives, for the other peripherals 1200.

Input/Output Subsystems

In one embodiment, the other peripherals 1200 may include a user interface subsystem used to present media to, and/or receive input from, a human user. In some embodiments, media may include audible, visual, and/or haptic content. Examples include images, videos, sounds, and/or vibration. Visual content may be displayed on a screen or touchscreen. Sounds and/or audio may be obtained from/presented to the user via a microphone and speaker assembly. In some situations, the user may be able to interact with the device via voice commands to enable hands-free operation. Additionally, rumble boxes and/or other vibration media may playback haptic signaling.

In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Digital Signal Processors, Modems, and Other Co-Processors

In one embodiment, the other peripherals 1200 may include other processors, co-processors, and/or specialized hardware (modems and codecs).

For example, a digital signal processor (DSP) is similar to a general purpose processor but may be designed to perform only a few tasks repeatedly over a well-defined data structure. For example, a DSP may perform an FFT butterfly over a matrix space to perform various time-frequency domain transforms. DSP operations often include, without limitation: vector-matrix multiplications, multiply accumulates, and/or bit shifts. DSP designs are heavily pipelined (and seldom branch), may incorporate specialized vector-matrix logic, and often rely on reduced addressable space and other task-specific optimizations. DSP designs may benefit from larger register/data structures and or parallelization.

A hardware codec may convert media data to an encoded data for transfer and/or converts encoded data to image data for playback. Much like DSPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). Codecs are often bottlenecked by network connectivity and/or processor bandwidth, thus codecs are seldom parallelized and may have specialized data structures (e.g., registers that are a multiple of an image row width, etc.).

Radios and/or modems are often used to provide network connectivity. Many embedded devices use Bluetooth Low Energy (BLE), Internet of Things (IoT), ZigBee, LoRa WAN (Long Range Wide Area Network), NB-IoT (Narrow Band IoT), and/or RFID type interfaces. Wi-Fi and 5G cellular modems are also commodity options for longer distance communication. Still other network connectivity solutions may be substituted with equal success, by artisans of ordinary skill given the contents of the present disclosure.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A system-on-a-chip, comprising:

a system bus;

a first processor core coupled to the system bus;

a neural network core coupled to the system bus;

where the neural network core is partitioned into a first set of neural network sub-cores and a second set of memory sub-cores;

where each sub-core of the neural network core comprises a router and a memory; and a translation logic comprising a neural network interface, a memory interface, and a packet-based interface, where the neural network interface enables access to the first set of neural network sub-cores, the memory interface enables access to the second set of memory sub-cores, and the packet-based interface is coupled to at least a first sub-core of the neural network core.

2. The system-on-a-chip of claim 1, where the memory interface provides an addressable memory space to the system bus, where the addressable memory space is controlled by the first processor core.

3. The system-on-a-chip of claim 2, further comprising a second intellectual property core and where the addressable memory space is accessible by the second intellectual property core.

4. The system-on-a-chip of claim 1, where a first router of the first sub-core is configured to route at least one packet to a second router of a second sub-core.

5. The system-on-a-chip of claim 1, where the first set of neural network sub-cores and the second set of memory sub-cores are statically partitioned at compile-time.

6. The system-on-a-chip of claim 1, where the first set of neural network sub-cores and the second set of memory sub-cores are dynamically partitioned at run-time.

7. The system-on-a-chip of claim 1, where the system bus is characterized by a word size and the packet-based interface is characterized by a payload size smaller than the word size.

8. A neural network core, comprising:

a plurality of sub-cores that is partitioned into a first set of neural network sub-cores and a second set of memory sub-cores, where each sub-core of the plurality of sub-cores comprises a corresponding router and a corresponding memory; and a translation logic comprising a neural network interface, a memory interface, and a packet-based interface, where the neural network interface enables access to the first set of neural network sub-cores, the memory interface enables access to the second set of memory sub-cores, and the packet-based interface is coupled to at least a first sub-core of the neural network core.

9. The neural network core of claim 8, where each sub-core of the plurality of sub-cores communicate with other sub-cores of the plurality of sub-cores using an asynchronous handshake protocol.

10. The neural network core of claim 9, where the asynchronous handshake protocol comprises a start handshake that initiates communication, one or more data handshakes for each data packet, and an end handshake that terminates communication.

11. The neural network core of claim 8, where the corresponding memory of each sub-core comprises a first memory of a first bit width.

12. The neural network core of claim 11, where the corresponding memory of each sub-core comprises a second memory of a second bit width greater than the first bit width.

13. The neural network core of claim 12, where each sub-core of the plurality of sub-cores further comprises processing hardware coupled to the corresponding memory that is physically constructed to access the first memory with the first bit width and the second memory with the second bit width.

14. The neural network core of claim 13, where the neural network interface and the memory interface are memory mapped to a system bus with a third bit width greater than or equal to the second bit width.

15. A method of operating a neural network core comprising a plurality of sub-cores, where each sub-core of the plurality of sub-cores comprises a router, a local memory, and a neural network processor logic that can be individually enabled and disabled, comprising:

partitioning the plurality of sub-cores of the neural network core into a first set of neural network sub-cores and a second set of memory sub-cores;

enabling the neural network processor logic for the first set of neural network sub-cores and disabling the neural network processor logic for the second set of memory sub-cores;

assigning a first range of memory addresses to the neural network core based on the first set of neural network sub-cores, where the first range of memory addresses has a first word length;

assigning a second range of memory addresses to system-wide memory based on the second set of memory sub-cores, where the second range of memory addresses has a second word length that is different than the first word length; and enabling the first range of memory addresses and the second range of memory addresses.

16. The method of claim 15, where partitioning the neural network core is statically assigned at compile-time.

17. The method of claim 15, where partitioning the neural network core is dynamically assigned at run-time based on one or more of: a number of neural network threads, a thread priority, a memory usage, a historic usage, a predicted usage, a power consumption, or a performance requirement.

18. The method of claim 15, further comprising partitioning the neural network core into a third set of reserve sub-cores.

19. The method of claim 18, further comprising allocating at least one core of the third set of reserve sub-cores to the first set of neural network sub-cores based on a neural network thread status.

20. The method of claim 18, further comprising allocating at least one core of the third set of reserve sub-cores to the second set of memory sub-cores based on system-memory activity.

* * * * *